Nov. 9, 1948.   T. W. RUNDELL   2,453,387
ARTICLE SUPPORTING CLOSURE FOR CABINETS
Filed Jan. 4, 1947   2 Sheets-Sheet 1
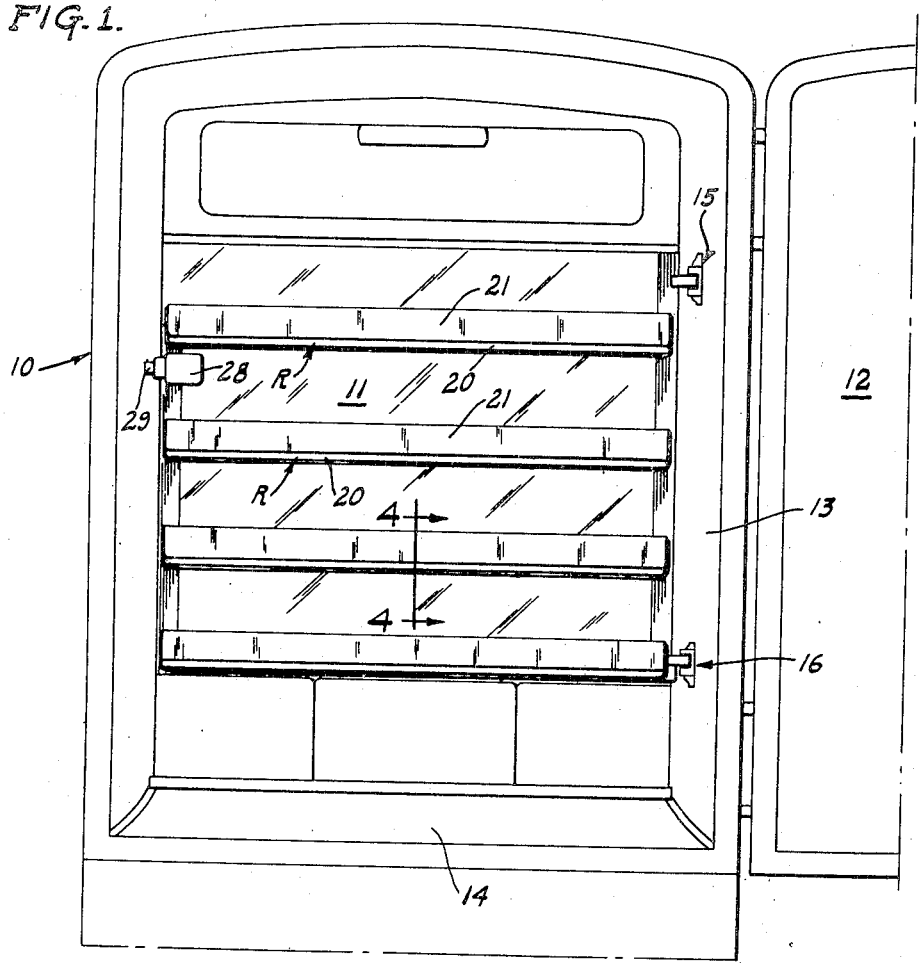
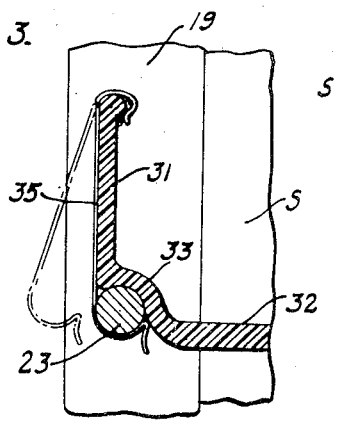
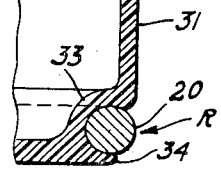
INVENTOR.
THEODORE W. RUNDELL
BY
Brown, Denk & Lynnestvedt
AGENTS Nov. 9, 1948.  T. W. RUNDELL  2,453,387
ARTICLE SUPPORTING CLOSURE FOR CABINETS
Filed Jan. 4, 1947  2 Sheets—Sheet 2
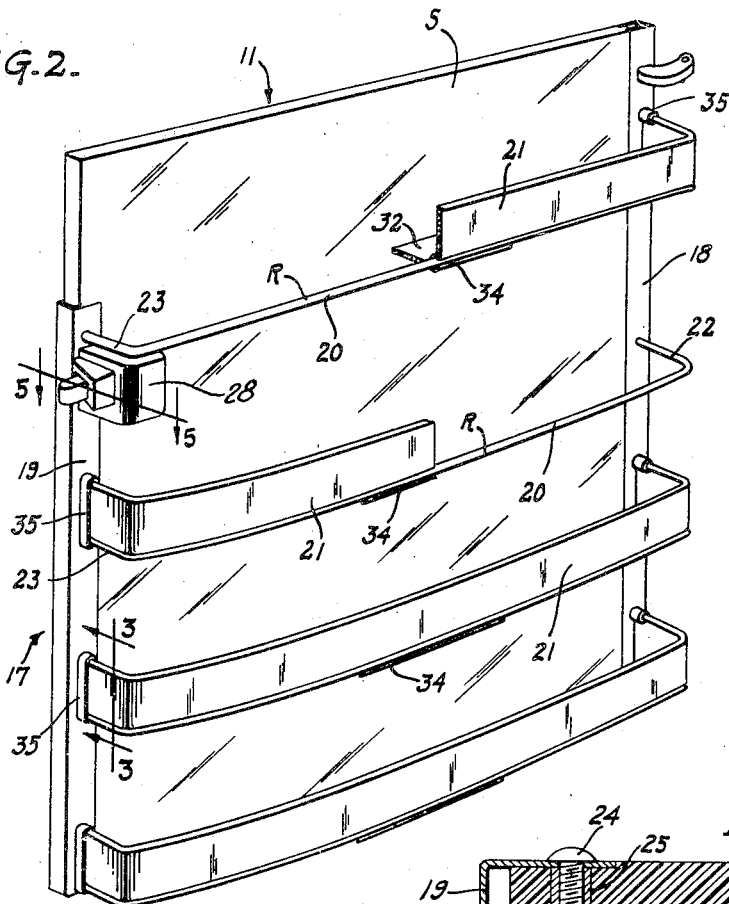
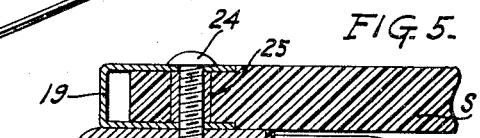
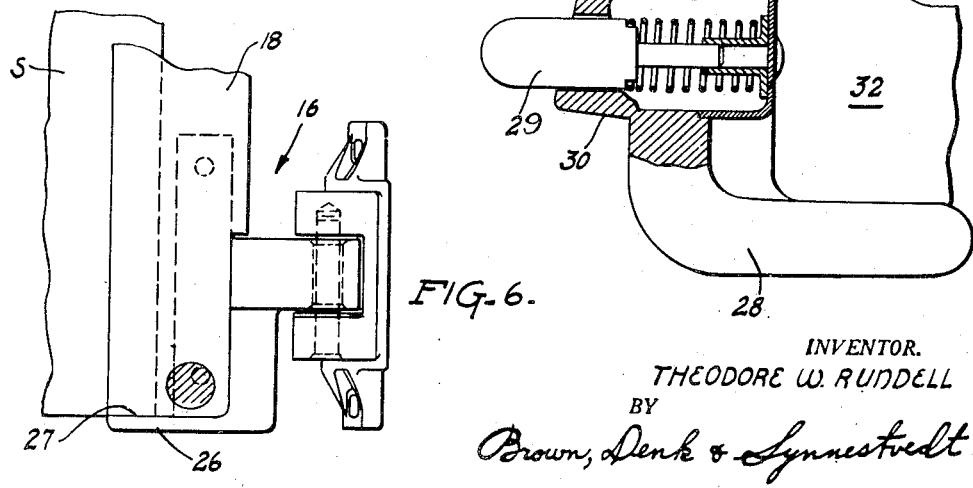
INVENTOR.
THEODORE W. RUNDELL
BY
Brown, Denk & Lynnestvedt
AGENTS Patented Nov. 9, 1948

2,453,387

UNITED STATES PATENT OFFICE 2,453,387

ARTICLE SUPPORTING CLOSURE FOR CABINETS

Theodore W. Rundell, Abington, Pa., assignor to Philco Corporation, Philadelphia, Pa., a corporation of Pennsylvania Application January 4, 1947, Serial No. 720,283

6 Claims. (Cl. 312—186)

The present invention relates to improvements in door construction and, more particularly, is concerned with doors of the type which serve also as auxiliary storage compartments.

While the apparatus of the invention is of wide applicability, it has especial utility in those refrigerators, of the household type, which include inner and outer closures, the inner of which is provided with shelves or bin-like receptacles providing additional, readily accessible storage space. Since the invention has particular utility in this field, the following description and the accompanying drawings are directed to such an embodiment.

It is highly desirable that such inner doors be transparent, both from the standpoint of appearance, and because the utility of the cabinet is greatly increased by the convenience with which the location of various stored articles may be determined. Attempts have been made to provide such transparent article-supporting doors. For example, doors including article-supporting glass panels have been suggested, but these constructions are not well adapted to the requirements of commercial practice. The inherent frangibility of the transparent material and the fact that the doors were not so designed as adequately to support the imposed loading, are among the factors which have militated against adoption of such constructions, for use under service conditions.

I have discovered, however, that a combined transparent door and auxiliary storage means is entirely feasible, provided that a suitable non-frangible material is employed, and that this material is mounted and supported in accordance with certain concepts now to be set forth. Certain so-called plastics are particularly desirable, as they meet the requirements of appearance, transparency and non-frangibility. The use of such materials, on the other hand, presents substantial problems—in spite of the relatively high strength of the plastic—primarily because of the fact that the modulus of elasticity of plastics suitable for this purpose is extremely low, and the plastic material is of relatively low inherent elasticity and, moreover, is subject to cold flow in the presence of loads applied over an extended period of time. I have discovered that the desirable characteristics of such plastic materials may be utilized in the construction of a door of the above-described type, if the door assembly is provided with a frame of such nature as to obviate the necessity of the transparent sheet carrying any substantial portion of the imposed load, and if the frame is so constructed as to resist relative displacement of certain portions thereof.

Accordingly, it is the primary object of the present invention to provide such a combined door and auxiliary storage means, which includes framing of such a character as to relieve the transparent backing sheet of the necessity of supporting either its own weight or the weight of the articles carried by the door assembly. To this general end, the invention contemplates provision of a pair of horizontally spaced, vertically extending framing elements, and a plurality of torque-resistant members interconnecting said framing elements and strengthening the same as against relative movement in the plane of said elements, and also as against forces tending to produce warping movements out of said plane. A substantially imperforate transparent sheet is utilized, said sheet preferably being made of relatively non-frangible plastic material and having opposed vertically extending edges supported by the aforesaid framing elements; it being a feature of the invention that the plastic sheet is mounted within said framing elements with some limited freedom for movement in the plane thereof, to accommodate the considerable expansion and contraction encountered over the temperature ranges met in refrigerator practice.

In particular accordance with another feature of the invention, the torque-resistant strengthening members serve also as means for carrying article-supporting shelves or baskets.

The invention extends further to certain features of constructional arrangement fully set forth in the following specification and illustrated in the accompanying drawings, in which:

Figure 1 is a front elevational view of a household refrigerator incorporating an inner door constructed in accordance with the present invention;

Figure 2 is a view, in perspective, illustrating the door assembly, certain portions being broken away to facilitate illustration of the frame construction;

Figure 3 is a sectional view, on an enlarged scale, the view being taken as indicated by the section line 3—3 applied to Figure 2;

Figure 4 is a sectional view further illustrating portions of the structure shown in Figure 3, the view being taken as indicated by the section line 4—4 of Figure 1;

Figure 5 is a sectional illustration, on an enlarged scale, through the door latch assembly and taken as indicated by the section line 5—5 of Figure 2; and, Figure 6 is a fragmentary elevational view, illustrating certain details of the door hinge construction.

Referring now in more detail to the above-identified figures, it is seen that the apparatus includes a refrigerator cabinet designated, generally, by the reference character 10, which cabinet includes inner and outer doors, shown at 11 and 12, respectively, the main outer door (12) being shown fragmentarily and in open position. Vertical and horizontal breaker strips 13 and 14 are arranged about the cabinet access opening, in accordance with usual practice, inner door 11 being carried by upper and lower hinge assemblies, shown at 15 and 16, respectively, and extending through the right hand vertical breaker strip to provide such support.

Since the present invention is not concerned with the details of the particular refrigerator cabinet, or with the refrigerating system utilized to cool said cabinet, description of these portions of the apparatus is not necessary herein. However, it will be understood that the main food compartment lies behind the door 11 (as viewed in Figure 1) and that the door, in effect, divides the useful storage area of said compartment into two readily accessible portions, one of which is defined by the article-supporting shelves carried by the door and to be later described.

Making reference to Figure 2, the door 11 comprises a single unitary sheet of transparent material, S, affording a clear view of the articles supported within the main compartment of the refrigerator. Preferably, this sheet is of a suitable acrylic resin and may, for example, have a thickness of about ⅜ inch.

In particular accordance with the invention, this plastic sheet is supported by a rigid metallic frame assembly designated, generally, by the reference numeral 17 (Figure 2) which assembly comprises right and left-hand, vertically extending channel members, shown at 18 and 19, respectively, which extend throughout a substantial portion of the height of the plastic sheet. These channels and other metallic parts of the door structure may advantageously be fabricated of rust-resistant metal, such as stainless steel. A plurality of horizontally disposed and vertically spaced rods or tubes, R, span the distance between the framing elements 18 and 19. These rods or tubes are of similar construction, and it will be observed that the horizontally extending section 20, of each thereof, is spaced forwardly from the plane of the plastic sheet and cooperates in supporting a shelf or bin-like member 21, in a manner to be more fully described hereinafter. Each of the horizontally extending rod sections 20 terminates in right and left-hand securing portions, represented at 22 and 23, respectively, which portions extend toward the plane of the framing elements or channels at substantially right angles thereto, and are rigidly secured to said framing elements. The plastic sheet S, which defines the main body of the door assembly 11, is slidingly received within the space confronting channels 18 and 19, the distance between the channels being such as to accommodate the expansion and contraction movements referred to above.

As appears in Figures 5 and 6, both the door latch and the lower hinge 16 include provision for securement of the sheet to the frame 17, to prevent inadvertent displacement of said sheet, in which connection it will be observed that the latch includes a threaded securing stud 24, serving both to mount the latch upon the channel 19 and to provide left-hand support for the plastic sheet. To this end, the sheet is apertured and, as shown in Figure 5, is provided with a bearing sleeve 25. The hinge assembly 16 includes a laterally extending angle portion 26 against the upper surface of which the plastic sheet bears, as indicated at 27.

Since the hinge and latch constructions, per se, are not features of the present invention, they need not be described in detail. It is sufficient to note that the latch includes a handle 28, and a bolt 29, the latter being mounted within a barrel 30 and spring urged toward a suitable strike (not shown), carried by the refrigerator cabinet; and that, with the exception of the supporting feature set forth just above, the hinges are of conventional construction which will be understood without further description.

Thus it will be seen that the plastic sheet is cradled within a rigid metallic frame, which frame is adapted for direct securement to the cabinet and is so constructed as to support both the sheet and the articles carried by the door assembly.

Experience has shown that a door of this type is subjected to displacement forces of two general types, now to be described, and that such displacement forces are resisted, in a positive manner, by the construction of the present invention. Firstly, and primarily as a result of the cold flow aforesaid, there is a tendency for the free (left-hand) edge of the door to sag under its own weight, thus resulting in distortion of the door structure in the plane thereof and consequent interference with alignment and proper closure. Under the influence of such a force, that is, a force tending to displace the channel 19 downwardly with respect to the channel 18 (which latter is secured to the cabinet), connecting portions 22 and 23 serve as torque rods and adequately resist such movement, since the right angular relation of these portions—with respect to the plane of sagging movement—is such that a couple exists tending to produce rotation of these portions, which said portions resist in torsion.

The second type of displacement force above referred to results from the fact that the load imposed by the articles within the receptacles 21 is displaced forwardly of the plane of the door and its supporting channels. Bearing in mind that the right-hand channel is fixed, by securement to the cabinet, and that such forces are exerted through a lever arm of appreciable length, it will again be recognized that a couple is produced, tending to rotate the door about a horizontal axis lying between the plane of the plastic sheet and the plane defined by the forward edges of the shelves 21. As a result, if this force is not adequately resisted, the upper left portion of the door will move forward appreciably, while the lower edge portion will, of course, be forced in the opposite direction. Such warping movements are resisted and completely nullified by the elongated sections 20 of the torque rod members, each of which is so disposed as to resist in torsion such warping movements tending toward displacement of the door out of the normal plane thereof.

The construction of the shelves or receptacles 21, and the manner in which they are supported by the strengthening rods or members R, appears to best advantage in Figures 3 and 4. As there illustrated, each shelf comprises a vertically extending wall portion 31 and a floor portion 32, extending rearwardly toward the backing sheet S. This wall structure is preferably molded of transparent plastic material and, as apparent from the drawings, the aforesaid wall and floor portions cooperate with the sheet to form basket-like receptacles occupying the space between sheet S and the central section 20 of the strengthening members R.

A characteristic feature of this construction resides in the ease with which the receptacles 21 may be removed, for cleaning or possible replacement. To this latter end, it will be noted that at the junction between the wall portions 31 and 32 the plastic material is provided with a re-entrant portion 33, extending about the basket and shaped and disposed to support the receptacle upon the upper surface of its associated rod R. To prevent accidental displacement, the lower central portion of the forward wall of each receptacle has a lip 34 formed thereon and adapted to bear against the lower surface of the central rod-section 20. In mounting the receptacles, the lip 34 is first engaged beneath the section 20 of the associated torque rod R, after which the rear edge of the receptacle is rotated downwardly until it assumes the position shown in the drawings, and particularly illustrated in Figure 4. To complete the assembly, spring clips 35 are then applied to those portions of the receptacle which lie adjacent the vertical framing elements 18 and 19; said clips being engaged beneath right and left-hand rod-portions 22 and 23, as clearly appears in Figures 2 and 3. Removal of any of the receptacles may be effected in an equally simple manner, it only being necessary to reverse the procedure set forth just above. This feature of the invention results not only in extreme simplicity of assembly, but also provides for accommodating articles of various shapes and sizes. For example, if such should be desired, one of the receptacles 21 may readily be removed, thereby providing sufficient distance between the receptacles to make it possible to support tall bottles, and the like. When the apparatus is used in this manner, the rod or member R which is not in use as a receptacle support, then serves as an additional guard rail preventing overturning of the bottles during opening and closing movements of the door.

I claim:

1. A door construction for use in refrigerators and like apparatus, comprising: a backing sheet of a type normally susceptible to distortion movements; and framing adapted for hinged securement to a cabinet for supporting said sheet, said framing including a vertically extending element disposed along and secured to said sheet adjacent an edge portion thereof and providing support for said sheet, said framing further including a member spanning a substantial part of the distance across said sheet and rigidly associated with the said element and sheet to strengthen the sheet as against distortion movements in the plane thereof and as against warping movements out of said plane, the spanning portion of said member being disposed in spaced relation with respect to the plane of the sheet and being so constructed and arranged as to resist in torsion forces tending to produce the aforesaid warping movements, and said member further including a second portion extending at right angles with respect to the plane of said sheet whereby to resist in torsion forces tending to produce the said distortion movements in the plane of the sheet.

2. A combined door and auxiliary storage means, for use in refrigerators and like apparatus, comprising: a backing sheet of a type normally susceptible to distortion movements; framing adapted for hinged securement to a cabinet for supporting said sheet, said framing including a vertically extending element disposed along and secured to said sheet adjacent an edge portion thereof and providing support for said sheet, said framing further including a member spanning a substantial part of the distance across said sheet and rigidly associated with the said element and sheet to strengthen the sheet as against distortion movements in the plane thereof and as against warping movements out of said plane, the spanning portion of said member being disposed in spaced relation with respect to the plane of the sheet and being so constructed and arranged as to resist in torsion forces tending to produce the aforesaid warping movements, and said member further including a second portion extending at right angles with respect to the plane of said sheet whereby to resist in torsion forces tending to produce the said distortion movements in the plane of the sheet; and an article-supporting shelf disposed between said sheet and the spanning portion of said member and at least partially supported by the latter.

3. A combined door and auxiliary storage means, for use in refrigerators and like apparatus, comprising: a backing sheet of a type normally susceptible to distortion movements; framing adapted for hinged securement to a cabinet for supporting said sheet, said framing including a vertically extending element disposed along and secured to said sheet adjacent an edge portion thereof and providing support for said sheet, said framing further including a member spanning a substantial part of the distance across said sheet and rigidly associated with the said element and sheet to strengthen the sheet as against distortion movements in the plane thereof and as against warping movements out of said plane, the spanning portion of said member being disposed in spaced relation with respect to the plane of the sheet and being so constructed and arranged as to resist in torsion forces tending to produce the aforesaid warping movements, and said member further including a second portion extending at right angles with respect to the plane of said sheet whereby to resist in torsion forces tending to produce the said distortion movements in the plane of the sheet; and wall structure removably carried by said member and cooperating with said sheet to form a basket-like receptacle disposed in the space between said sheet and the spanning portion of said member.

4. In a door construction for use in refrigerators and like apparatus: a pair of horizontally spaced vertically extending framing elements, one of said elements being adapted for hinged securement to a cabinet; and a generally U-shaped torque-resistant member interconnecting said framing elements and strengthening the same as against relative movement in the plane of said elements and as against warping movements out of said plane, said member comprising an elongated horizontally extending central section spanning the distance between said elements and spaced from the plane defined thereby, said central section having at each end thereof a relatively short securing portion each extending toward the said plane defined by said framing elements in substantially right angular relation with respect to said plane and rigidly secured to the adjacent framing elements.

5. A combined door and auxiliary storage means, for use in refrigerators and like apparatus, comprising: a pair of horizontally spaced vertically extending framing elements comprising confronting channels, one of said channels being adapted for hinged securement to a cabinet, a generally U-shaped torque-resistant member interconnecting said channels and strengthening the same as against relative movement in the plane thereof and as against warping movements out of said plane, said member comprising an elongated horizontally extending central section spanning the distance between said channels and spaced from the plane defined thereby, said central section having at each end thereof a relatively short securing portion each extending toward the said plane defined by said channels in substantially right angular relation with respect to said plane and rigidly secured to the adjacent channel; a backing sheet having opposed vertically extending edges received within and supported by said channels; and an article-supporting shelf disposed between said sheet and the central section of said member and removably supported by the latter.

6. A combined door and auxiliary storage means, for use in refrigerators and like apparatus, comprising: a pair of horizontally spaced vertically extending framing elements comprising confronting channels, one of said channels being adapted for hinged securement to a cabinet, a generally U-shaped torque-resistant member interconnecting said channels and strengthening the same as against relative movement in the plane thereof and as against warping movements out of said plane, said member comprising an elongated horizontally extending central section spanning the distance between said channels and spaced from the plane defined thereby, said central section having at each end thereof a relatively short securing portion each extending toward the said plane defined by said channels in substantially right angular relation with respect to said plane and rigidly secured to the adjacent channel; a substantially imperforate transparent sheet having opposed vertically extending edges received within and supported by said channels; and wall structure removably carried by said member and cooperating with said sheet to form a basket-like receptacle disposed in the space between said sheet and the central section of said member.

THEODORE W. RUNDELL.

REFERENCES CITED

The following references are of record in the file of this patent:

UNITED STATES PATENTS

| Number | Name | Date |
|---|---|---|
| 2,051,132 | Dart | Aug. 18, 1936 |
| 2,135,878 | Sekyra | Nov. 8, 1938 |